Aug. 20, 1940.  E. C. FRANCO-FERREIRA  2,211,813
METHOD OF MAKING HEAT EXCHANGE DEVICES
Filed Nov. 19, 1938  2 Sheets—Sheet 1
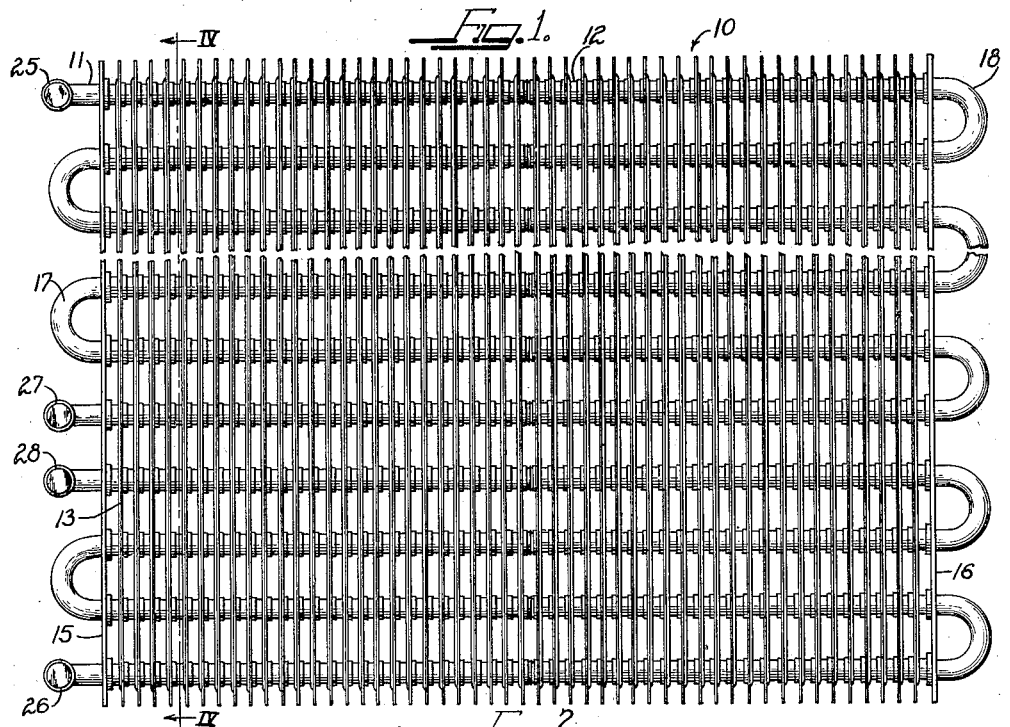
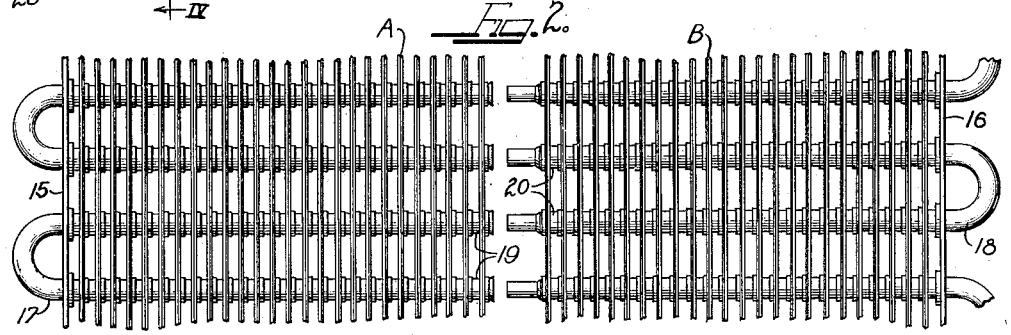
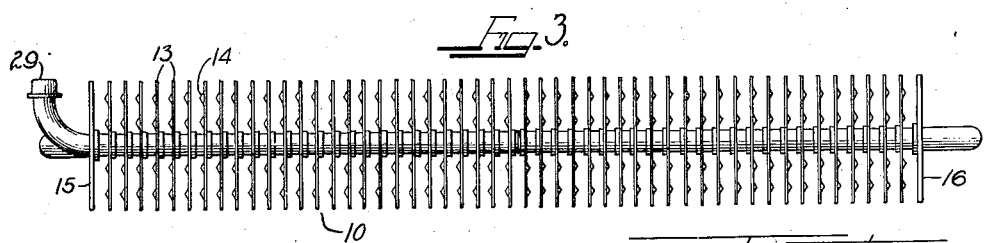
Inventor
EDGARD. C. FRANCO-FERREIRA Aug. 20, 1940. E. C. FRANCO-FERREIRA 2,211,813
METHOD OF MAKING HEAT EXCHANGE DEVICES
Filed Nov. 19, 1938 2 Sheets-Sheet 2
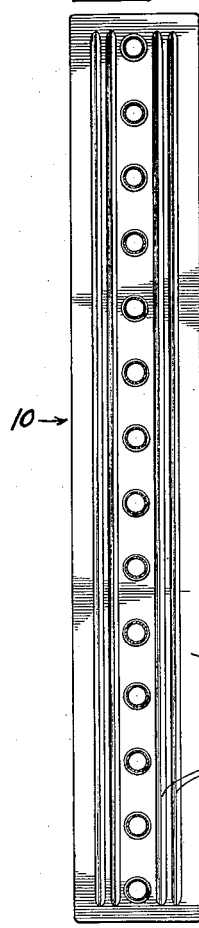
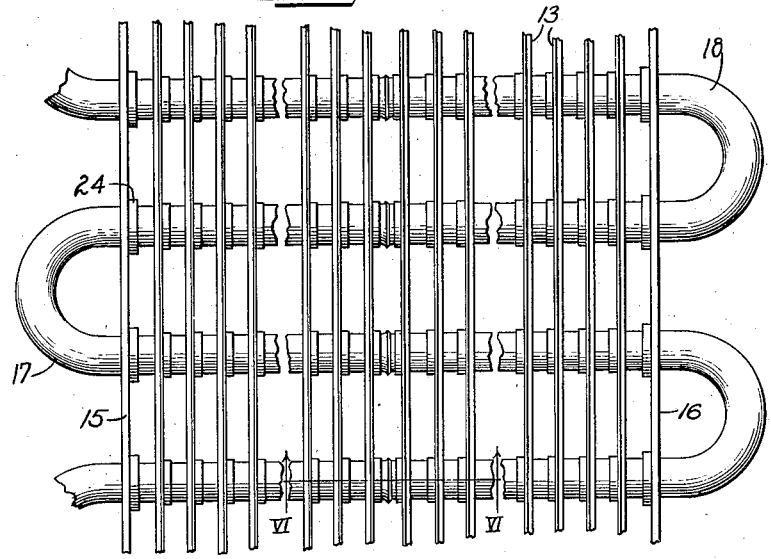
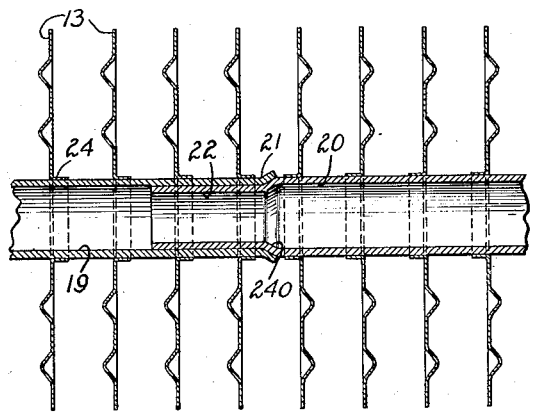
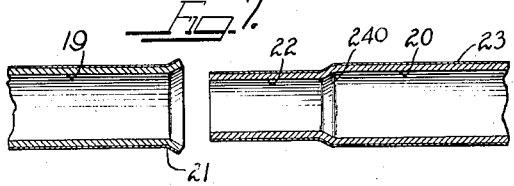
Inventor
EDGARD. C. FRANCO-FERREIRA Patented Aug. 20, 1940

2,211,813

UNITED STATES PATENT OFFICE 2,211,813

METHOD OF MAKING HEAT EXCHANGE DEVICES

Edgard C. Franco-Ferreira, Chicago, Ill., assignor to Houdaille-Hershey Corporation, Detroit, Mich., a corporation of Michigan Application November 19, 1938, Serial No. 241,305

5 Claims. (Cl. 29—157.3)

This invention relates to a heat exchange device and to a method of making the same. More particularly the invention relates to the manufacture of a condenser, such as used in mechanical refrigeration, by a method that obviates the necessity of return flow headers.

Heretofore, it has been customary to manufacture condensers and similar types of heat exchangers from a continuous length of tubing bent into a serpentine form, or from straight lengths of tubing, the ends of which are connected to headers provided with return flow communicating passages to form a continuous conduit for the flow of the refrigerant. The continuous type construction is relatively more expensive and the header type construction, using headers formed of metal stampings, is such as to present large areas that must be perfectly sealed if leaks are to be prevented.

It has also been proposed to dispense with headers and employ short U bends for joining the successive ends of straight lengths of tubing forming the body of the condenser, but this has the disadvantage of presenting a great number of joints that must be perfectly sealed. The usual way of sealing such joints is by brazing or solder dipping, neither of which is entirely satisfactory as formerly practiced. In the brazing operation, for instance, it has been customary to employ copper or brass brazing wires that must be individually laid in place adjacent the joint to be brazed, thereby necessitating a considerable amount of manual labor.

In accordance with my present invention, a condenser is first formed in two complementary halves, each comprising hairpin bends of tubing, and the halves so formed are then united in a single brazing operation that also serves to bond the fins to the straight, parallel legs of said tubing. The brazing operation is greatly simplified by first plating the hairpin bends of tubing with copper, which serves as the sole brazing agent in the operation. It is a comparatively simple matter, using the method of my invention, to obtain tight joints between the mated ends of the tubing and bonds of high thermal conductivity between the fins and the tubing. Also, my novel construction lends itself admirably to the manufacture of condensers of varying lengths, since with a minimum amount of tooling, the tube length of the hairpin bend may be made longer or shorter, as desired, to give a correspondingly longer or shorter length of condenser.

It is therefore an important object of this invention to provide a relatively simple and inexpensive method of making heat exchangers, or condensers, which method eliminates the use of headers and reduces the number of joints that must be sealed to make the condenser fluid tight.

It is a further important object of this invention to provide a method of making heat exchangers or condensers that lends itself peculiarly to the manufacture of large or small condensers with a minimum of tooling operations.

It is a further important object of this invention to provide a novel and improved construction of heat exchange devices, or condensers, that obviates the necessity of headers and that lends itself to more economical production.

Other and further important objects of this invention will be apparent from the disclosures in the specification and the accompanying drawings.

This invention (in a preferred form) is illustrated in the drawings and hereinafter more fully described.

On the drawings:

Figure 1 is a broken top plan view of a heat exchanger, or condenser, embodying the principles of my invention.

Figure 2 is a fragmentary view illustrating the method of manufacturing the condenser in two complementary halves.

Figure 3 is an end elevational view of the condenser of Fig. 1.

Figure 4 is a sectional view taken substantially along the line IV—IV of Fig. 1.

Figure 5 is a fragmentary, broken, enlarged plan view of the condenser.

Figure 6 is an enlarged sectional view taken substantially along the line VI—VI of Fig. 5.

Figure 7 is an enlarged fragmentary, detail view of the mating end of the tubing prior to assembly.

As shown on the drawings:

In Figs. 1, 3 and 4, the reference numeral 10 indicates generally a heat exchange device or condenser embodying the principles of my invention. Said condenser in its finished form comprises lengths of tubing 11, on the straight, parallel legs 12 of which are mounted transversely extending fins 13. Said fins 13 may suitably be provided with longitudinally extending corrugations 14, which serve to increase the heat radiating surface of the fins. In the preferred embodiment of my invention, both the tubing 11 and fins 13 are formed of plain carbon or soft steel. End plates 15 and 16, preferably of dead soft steel, lie outside of the fins 13 and just inside the U-bends of the tubing.

In the manufacture of the condenser 10, steel tubing is first bent into U- or hairpin tubes, such as the tubes 17 and 18 (Fig. 2) with straight, parallel legs 19 and 20, respectively, of the desired length. The legs 19 of the tubes 17 are then flared at their ends 21, as best shown in Fig. 7, to constitute the female members, and the corresponding ends of the legs 20 of the tubes 18 are reduced, as at 22, for insertion into the flared ends 21. The tubes 17 and 18 are then provided for their full lengths, or for the straight lengths thereof, with a coating of brazing material, represented by the layer 23 (Fig. 7), which may suitably be a copper electroplate. The thickness of copper plate is preferably a minimum of about 0.0006 inch, but may be more or less as required. Instead of copper plating the U-bends, a layer of copper, brass or other brazing material may be adherently applied as in powder or paste form to the tubing, or only to the swaged ends thereof.

After the tubes have been copper plated, or otherwise provided with brazing material on their outer surfaces, the end plates 15 and 16 and the fins 13 are mounted in position upon the straight lengths 19 and 20 of the respective tubes 17 and 18. The mounting of the fins and end plates on the straight lengths of the tubes 17 and 18 may be performed before forming the tubes with mating ends, and, as is obvious, must be performed in advance of flaring the ends of the tubes 19. The end plates 15 and 16 and the fins 13 are all provided with annual collars, similar to the collar 24 (Fig. 5) surrounding the tube receiving apertures and the collars and apertures are of such a diameter as to provide a close fit for the legs of the tubing. There are thus formed two complementary halves, represented by the reference letters A and B (Fig. 2) and constituting the tubes 17 and associated end plates 15 and fins 13, and the tubes 18 and associated end plates 16 and fins 13, respectively.

The complimentary halves A and B are next joined by forcing the respective ends 19 and 22 of the tubing into a telescopic fit, each reduced end 22 being force fitted into the corresponding flared end 21 until said flared ends 21 rest in abutting relationship against the shoulders 240 of the reduced ends 22 (Fig. 6).

The assembled condenser unit 10 is next subjected to a brazing operation, which may suitably comprise passing the unit into a furnace having a non-oxidizing, or reducing atmosphere heated to a sufficiently high temperature to melt the copper of the electroplate layer 23 and cause the copper to flow into around the joints between the mating ends 21 and 22 of the tubing and between the annual collars 24 of the fins and the outside of the tubing. In general, a temperature of between 1850 and 2000° F. is satisfactory for effecting the brazing of the parts together. Higher or lower temperatures, however, may be used depending upon the metal of which the condenser is made and the composition of the brazing material. In a reducing atmosphere, such as an atmosphere relatively rich in hydrogen, the brazing material flows readily by virtue of capillary action into the close fitting joints, and upon the cooling of the condenser unit after leaving the furnace, the joints will be found to be fluid tight and of high thermal conductivity.

As shown in Fig. 1, the condenser 10 may be provided with two or more ends for connection in a refrigerant system, such as the ends 25 and 26 at the extremities of the tubing, and the ends 27 and 28 intermediate the extremities of the unit. These ends 25 to 28 inclusive are closed by means of caps 29 immediately subsequent to the completion of the condenser units, in order to prevent rusting of the insides of the tubing or the introduction of foreign material into the tubing. These caps 29 are not removed until the condenser unit is actually put into a refrigeration installation.

It will be evident from the foregoing description that the use of relatively long lengths of tubing to provide hairpin or U-bends for the complementary half sections of the condenser eliminates all joints in the fluid conduits other than the joints along the median line of the condenser when the half sections are united. In accordance with this invention, these joints are of the press fit, telescoping type, so that when brazed, they can readily be made fluid tight. By merely selecting the length of tubing originally necessary to give the desired overall length of condenser, any size of condenser can be made with a minimum amount of tooling.

The use of copper plating, as above described, obviates the use of any other form of brazing material, the copper of the electroplate constituting the sole brazing means for all of the joints of the condenser. This results in considerable saving in manual labor over the application of brazing wire, shims or the like, as has heretofore been customary.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of making a heat exchange device, which comprises forming U-shaped bends of tubing having straight parallel legs open at their ends, reducing the ends of some of said tubes, expanding the ends of others of said tubes to telescopingly receive said reduced ends, copper plating said tubing, assembling fins on said legs to form complementary half sections, press fitting said reduced and expanded ends of said half sections together and heating the assembled unit to a brazing temperature to cause said copper plating to melt and serve by itself to bond said halves together and said fins to said tubing legs.

2. The method of making a heat exchange device, which comprises forming a plurality of sets of U-shaped tubing with mating ends, plating said tubing with brazing material, assembling fins on the legs of said tubing to form complementary halves, mating the ends of one half with the ends of the other half to provide a continuous conduit through a plurality of turns of said tubing and heating the assembled unit to a sufficiently high temperature to effect brazing of said mated ends together and of said fins to said tubes through the flow of said brazing material.

3. The method of making a heat exchange device, which comprises forming a plurality of sets of steel U-shaped tubing with telescoping ends, plating said tubing with brazing material, assembling steel fins on the legs of said tubing to form complementary halves, press fitting to telescope the ends of one half with the ends of the other half to provide a continuous conduit through a plurality of turns of said tubing and heating the assembled unit to a sufficiently high temperature to effect brazing of said mated ends together and of said fins to said tubes through the flow of said brazing material as the sole bonding medium.

4. The method of making a heat exchanger which comprises bending tubing into U-shape to provide a plurality of U-shaped members each having a pair of spaced legs, coating the tubing with brazing material, assembling fins on the legs of the tube members to provide complementary heat exchanger sections, forming mating male and female ends on the legs of the U-shaped members in the complementary sections, press fitting the mating ends of the legs into telescoping relation, and heating the assembled units to a sufficiently high temperature to effect brazing together of the telescoped members and of said fins to said members through the flow of the brazing material coating.

5. The method of making a heat exchanger from tubes, apertured end plates, and apertured fins which comprises providing a coating of bonding material on the tubes, bending the tubes into U shape to form a plurality of conduit members each having spaced parallel legs, inserting the legs of the members through the apertures of the end plates and fins to position the members in the plates with each end plate disposed adjacent the U-bend of a member and bridging the space between the legs thereof and to position the fins in spaced transverse relation on the members for forming complementary heat exchanger sections, forming press-fit ends on the legs of the complementary sections, press-fitting said ends together to provide a continuous passage through a plurality of turns of the tubes, and heating the assembled unit to a sufficiently high temperature to effect a bonding together of the press-fitted leg ends as well as a uniting of the fins and end plates to the tubes through flow of the bonding material coating on the tubes.

EDGARD C. FRANCO-FERREIRA.